(12) United States Patent
Christensen et al.

(10) Patent No.: US 7,328,581 B2
(45) Date of Patent: Feb. 12, 2008

(54) LOW EMISSION THERMAL PLANT

(75) Inventors: Tor Christensen, Sandefjord (NO);
Henrik Fleischer, Slependen (NO);
Knut Børseth, Tåmåsen (NO)

(73) Assignee: Sargas AS, Oslo (NO)

( * ) Notice: Subject to any disclaimer, the term of this patent is extended or adjusted under 35 U.S.C. 154(b) by 411 days.

(21) Appl. No.: 10/499,872

(22) PCT Filed: Jun. 20, 2003

(86) PCT No.: PCT/NO03/00210

§ 371 (c)(1),
(2), (4) Date: Jul. 22, 2004

(87) PCT Pub. No.: WO04/001301

PCT Pub. Date: Dec. 31, 2003

(65) Prior Publication Data

US 2005/0166569 A1    Aug. 4, 2005

(30) Foreign Application Priority Data

Jun. 21, 2002   (NO) ................................. 20023050

(51) Int. Cl.
*F02C 6/00* (2006.01)
*F02C 7/00* (2006.01)
(52) U.S. Cl. .................. 60/783; 60/39.182; 60/784
(58) Field of Classification Search ............... 60/39.12, 60/39.182, 39.52, 772, 783, 784
See application file for complete search history.

(56) References Cited

U.S. PATENT DOCUMENTS 4,498,289 A * 2/1985 Osgerby ................ 60/39.52
6,637,183 B2 * 10/2003 Viteri et al. ............. 60/39.182
7,089,743 B2 * 8/2006 Frutschi et al. ............... 60/772

FOREIGN PATENT DOCUMENTS

| EP | 0 537 593 B1 | 4/1993 |
| EP | 0551876 A2 | 7/1993 |
| NO | 146184 B | 3/1978 |
| WO | WO-00/03126 A1 | 1/2000 |
| WO | WO 00/48709 A1 | 8/2000 |
| WO | WO 00/57990 A1 | 10/2000 |

* cited by examiner

Primary Examiner—L. J. Casaregola
(74) Attorney, Agent, or Firm—Birch, Stewart, Kolasch & Birch, LLP

(57) ABSTRACT

A method for the generation of electrical power from a carbonaceous fuel, wherein the fuel is combusted in presence of oxygen under increased pressure in a combustion chamber is described. The exhaust gas from the combustion is separated into a $CO_2$ rich fraction that is handled so that it does not escape to the surroundings, and a $CO_2$ depleted fraction that is expanded over one or more turbines to power other processes and/or generation of electrical power, before the gas is released into the surroundings, where the temperature in the combustion chamber is reduced under the generation of steam that is expanded over steam turbines connected to electrical generator for the generation of electrical power. Additionally a thermal power plant for the performing of the method is described.

20 Claims, 3 Drawing Sheets

LOW EMISSION THERMAL PLANT

BACKGROUND OF THE INVENTION

1. Field of the Invention

The present invention relates to a method for regulation of the $CO_2$ content in combustion products from a pressurised, non-adiabatic combustion chamber before expansion of the products of combustion to atmospheric pressure, an installation for execution of the method and a thermal power plant where the present method is used.

2. Description of Background Art

The concentration of $CO_2$ in the atmosphere has increased by nearly 30% in the last 150 years. The concentration of methane has doubled and the concentration of nitrogen oxides has increased by about 15%. This has increased the atmospheric greenhouse effect, something which has resulted in:

The mean temperature near the earth's surface has increased by about 0.5° C. over the last one hundred years, with an accelerating trend in the last ten years.

Over the same period rainfall has increased by about 1%

The sea level has increased by 15 to 20 cm due to melting of glaciers and because water expands when heated up.

Increasing discharges of greenhouse gases is expected to give continued changes in the climate. Temperature can increase by as much as 0.6 to 2.5° C. over the coming 50 years. Within the scientific community, it is generally agreed that increasing use of fossil fuels, with exponentially increasing discharges of $CO_2$, has altered the natural $CO_2$ balance in nature and is therefore the direct reason for this development.

It is important that action is taken immediately to stabilize the $CO_2$ content of the atmosphere. This can be achieved if $CO_2$ generated in a thermal power plant is collected and deposited safely. It is assumed that the collection represents three quarters of the total costs for the control of $CO_2$ discharges to the atmosphere.

Thus, an energy efficient, cost efficient, robust and simple method for removal of a substantial part of $CO_2$ from the discharge gas will be desirable to ease this situation. It will be a great advantage if the method can be realised in the near future without long-term research.

Discharge gas from thermal power plants typically contains 4 to 10% by volume of $CO_2$, where the lowest values are typical for gas turbines, while the highest values are only reached in combustion chambers with cooling, for example, in production of steam.

There are three opportunities for stabilising the $CO_2$ content in the atmosphere. In addition to the capturing of $CO_2$, non-polluting energy sources such as biomass can be used, or very efficient power plants can be developed. The capturing of $CO_2$ is the most cost efficient. Still, relatively little development work is carried out to capture $CO_2$, the methods presented up till now are characterised either by low efficiency or by a need for much long-term and expensive development. All methods for capturing $CO_2$ comprise one or more of the following principles:

Absorption of $CO_2$. The exhaust gas from the combustion is brought into contact with an amine solution, at near atmospheric pressure. Some of the $CO_2$ is absorbed in the amine solution which is then regenerated by heating. The main problem with this technology is that one operates with a low partial pressure of $CO_2$, typically 0.04 bar, in the gas which shall be cleaned. The energy consumption becomes very high (about 3 times higher than if it is cleaned with a $CO_2$ partial pressure of 1.5 bar). The cleaning plant becomes expensive and the degree of cleaning and size of the power plant are limiting factors. Therefore, the development work is concentrated on increasing the partial pressure of $CO_2$. An alternative is that the exhaust gas is cooled down and re-circulated over the gas turbine. The effect of this is very limited due to the properties of the turbine, among other things. Another alternative is that the exhaust gas which is to be cooled down, is compressed, cooled down again, cleaned with, for example, an amine solution, heated up and expanded in a secondary gas turbine which drives the secondary compressor. In this way, the partial pressure of $CO_2$ is raised, for example to 0.5 bar, and the cleaning becomes more efficient. An essential disadvantage is that the partial pressure of oxygen in the gas also becomes high, for example 1.5 bar, while amines typically degrade quickly at oxygen partial pressures above about 0.2 bar. In addition, costly extra equipment is required. Other combinations of primary and secondary power stations exist.

Air separation. By separating the air that goes into the combustion installation into oxygen and nitrogen, circulating $CO_2$ can be used as a propellant gas in a power plant. Without nitrogen to dilute the $CO_2$ formed, the $CO_2$ in the exhaust gas will have a relatively high partial pressure, approximately up to 1 bar. Excess $CO_2$ from the combustion can then be separated out relatively simply so that the installation for collection of $CO_2$ can be simplified. However the total costs for such a system becomes relatively high, as one must have a substantial plant for production of oxygen in addition to the power plant. Production and combustion of pure oxygen represent considerable safety challenges, in addition to great demands on the material. This will also most likely require development of new turbines.

Conversion of the fuel. Hydrocarbon fuels are converted (reformed) to hydrogen and $CO_2$ in pressurised processing units called reformers. The product from the reformers contains $CO_2$ with a high partial pressure so that $CO_2$ can be separated out and deposited or used in another way. Hydrogen is used as fuel. The total plant becomes complicated and expensive, as it comprises a hydrogen-generating plant and a power plant.

A common feature of the alternative methods for capture of $CO_2$ from a power plant is that they strive for a high partial pressure of $CO_2$ in the processing units where the cleaning is carried out. In addition, alternative methods are characterised by long-term, expensive and risky developments, with a typical time frame of 15 years research and a further 5 to 10 years or more before operating experience is attained. Expected electrical efficiency is up to 56 to 58% for a plant without cleaning and probably, somewhat optimistically, 45 to 50% with cleaning. An extended time frame is environmentally very undesirable. In a United Nations Economic Commission for Europe (UNECE) conference in the autumn of 2002, "an urgent need to address the continuing exponential rise in global $CO_2$ emissions" was emphasised and words such as "as soon as possible" and "need to go far beyond Kyoto protocol targets" were used.

Thus there is a need for plants that overcome the mentioned problems, having the following characteristics:

Realisable without long-term development, preferably with the use of rotary equipment that has already been tested out.

Adapted for a sufficient partial pressure of $CO_2$ so that conventional absorption installations can be used effectively, which means partial pressures up to 1.5 bar.

Lowest possible gas stream volume where $CO_2$ shall be captured.

Partial pressure of oxygen down towards 0.2 bar where $CO_2$ shall be captured for thereby to minimise the degradation of the absorption agent.

Possibility for effective cleaning of NOx, which is typically carried out in the temperature range 300 to 400° C. Cleaning in a pressurised system is optimal.

Efficiency in line with competing systems.

Possibility for large installations above 400 MW.

No use of secondary power systems, reformers, processes for production of oxygen or processes for conversion of the fuel.

Compact and robust plant to benefit from the cost advantages by building the plant at shipyards on floating constructions. This also makes use at offshore installations possible.

SUMMARY OF THE INVENTION

According to the present invention a method for the generation of electric power from a carbonaceous fuel is provided, in which the fuel is combusted in the presence of oxygen under elevated pressure in a combustion chamber. The exhaust gas from the combustion is separated into one $CO_2$ rich fraction which is treated so that it is not discharged to the environment, and one $CO_2$ depleted fraction which is expanded over one or more turbines for operation of other processes and/or generation of electric energy, before it is released into the surroundings, where the temperature in the combustion chamber is reduced under generation of steam which is expanded over steam turbines connected to an electricity generator for generation of electric power. Combustion under pressure in a combustion chamber as described above gives a considerable advantage in that a high partial pressure of $CO_2$ and a low partial pressure of oxygen in the combustion products are obtained without re-circulation of gas and without abnormally high temperatures of the combustion products.

It is preferred that more than 50%, preferably more than 60% and most preferably more that 70%, such as for example above 80% of the heat energy from the combustion in the combustion chamber is taken out in the form of steam. In that most of the energy is taken out as steam, the dependency of the efficiency on critical units, such as high temperature pressurised heat exchangers (above 600° C.) is reduced, and the use of such units is reduced to a minimum. This is achieved by a sizeable reduction of the load on such units.

It is preferred that the exhaust gas from the combustion chamber is cooled by heat exchange with the $CO_2$ depleted fraction for heating of the $CO_2$ depleted fraction before this is expanded over turbines. This leads to increased efficiency in that the heat energy in the exhaust gas is taken care of and is used to drive the turbines.

It is also preferred that water and/or air is added to the cleaned $CO_2$ depleted fraction to increase the ability of the $CO_2$ depleted fraction to take up heat from the hot exhaust gas from the combustion chamber.

Similarly, it is preferred that the fuel is heated before it is fed to the combustion chamber. It has been found that this will increase the efficiency of the total process, i.e. that as much as possible of the chemical energy in the fuel is converted to electric energy.

It is particularly preferred that the fuel is heated in heat exchanging with a part stream from the air compressor and where the heat-exchanged, and thus cooled, compressed air stream is added to the $CO_2$ depleted fraction to increase its heat capacity.

In combination with this, large amounts of "cheap" low-pressure steam are provided, i.e. without appreciably affecting the efficiency of the plant, for regeneration of the absorption agent. At the same time, the possibility of bringing back much of this low-grade energy arises, together with low-grade energy from the coolers in the compression train for $CO_2$, as a useful contribution to the production of electric power. A further detail to collect low-grade energy for the energy production is included in that the use of a pressurised air-water mixture, at a suitable location in the plant, can give evaporation of water and thereby take up much energy at temperatures far below the boiling point for water at the prevailing pressure.

It is a combination of these characteristics that makes it practically possible to realise the plant, with a competitive efficiency in the area of 43.5 to 46% or more dependent on the extent of optimisation and degree of cleaning of $CO_2$. A degree of cleaning of 90% or more should be attainable.

Furthermore, a thermal power plant for carbonaceous fuel, preferably a hydrocarbon, is described, comprising a combustion chamber in which the fuel is combusted under elevated pressure in the presence of oxygen, an exhaust gas line for leading of the combustion gas from the combustion chamber to a contact device where the exhaust gas is brought after cooling into contact with an absorption agent in which mainly $CO_2$ is absorbed and where the other gases in the exhaust gas, in the main, are not absorbed, a gas line (14) for the non-absorbed gas from the contact device, means to reheat the $CO_2$ depleted gas stream, means for expansion of this heated $CO_2$ depleted gas stream before it is released into the surroundings, and means to transport the absorption agent with absorbed $CO_2$ from the contact device to be deposited or to means for regeneration of the absorption agent for recycling to the contact device, where the combustion chamber comprises means to provide steam and lines to feed the steam to steam-turbines to expand.

It is preferred that the thermal power plant comprises a condensation chamber for condensation of water in the exhaust gas arranged before the contact device. In this way water which arises from the combustion of the exhaust gas is removed. Water is unwanted in the cleaning process as it can harm/destroy the absorption agent.

It is furthermore preferred that the thermal power plant comprises means to supply the water, which is condensed in the condensation chamber, to the $CO_2$ depleted fraction to increase the heat capacity of this fraction.

It is also preferred that the combustion chamber comprises an outer shell and an inner shell between which a cooling agent flows and where a pipe that covers the inner surface of the combustion chamber is arranged, and means to circulate water through the pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will now be explained in more detail with reference to preferred embodiments and the enclosed figures, in which.

DETAILED DESCRIPTION OF THE PREFERRED EMBODIMENTS

Figure 1:
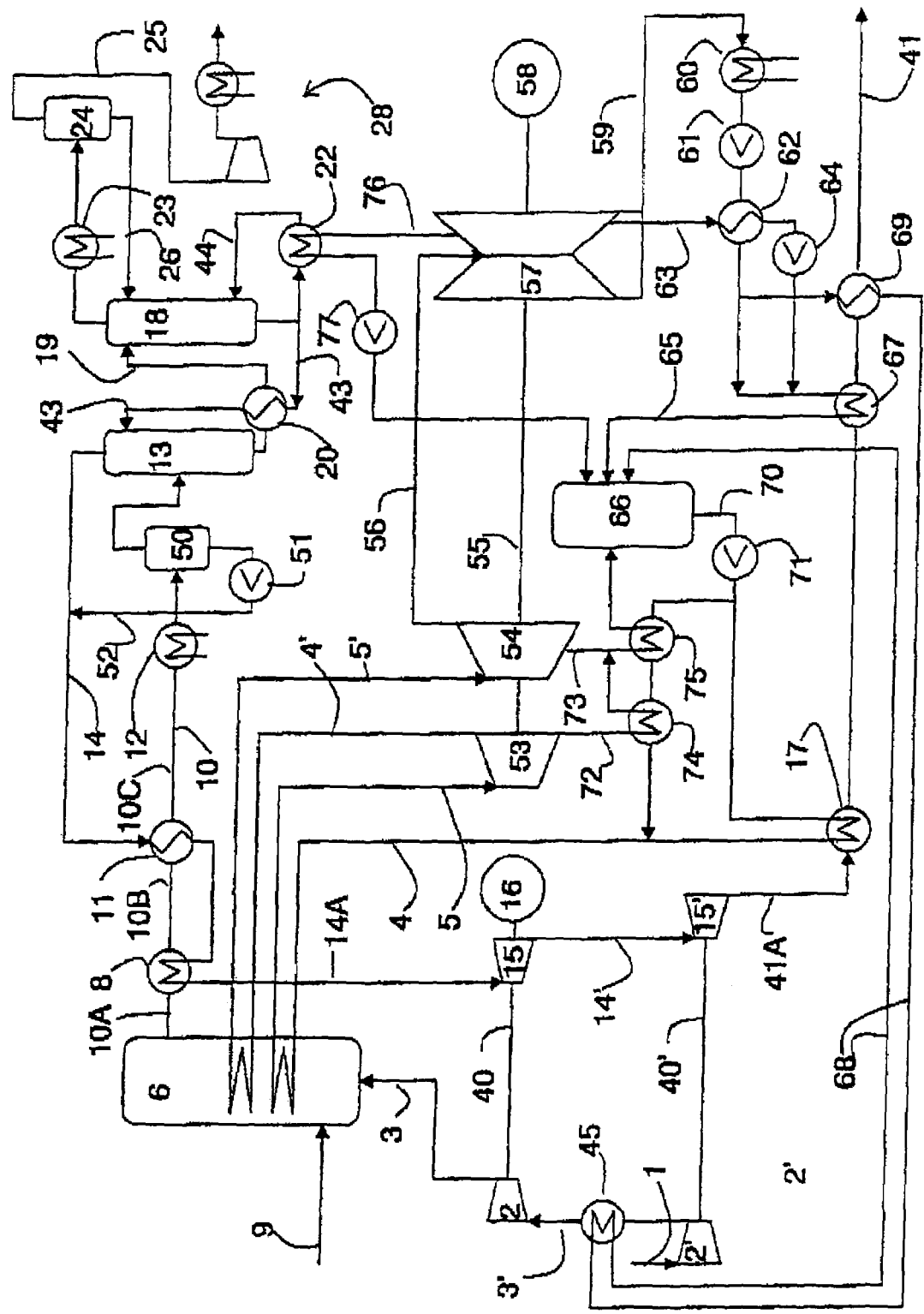
FIG. 1 is a simplified flow diagram that shows a basic embodiment of a gas power station according to the present invention.

The basic configuration, as illustrated in FIG. 1, will be described first. The flow diagram is independent of the size of the plant but, with respect to the amounts described here, refers to a 400 MW plant.

The oxygen containing gas, such as air, oxygen-enriched air or oxygen, hereafter referred to in the present description and patent claims as "air", that enters the plant in an air line 1, is compressed in a compressor 2,2'. The compressor can be in one stage, but it is preferred that the compressor 2 is two or more compressors in series, preferably with intermediate cooling of the air between the compressors 2 and 2' as shown by a heat exchanger 45 that cools the air in line 3' between the two compressors. Two compressors, 2,2', as shown in FIG. 1, are preferred at the favoured working pressure for the present invention which lies around 16 bar. The incoming air is compressed in the compressor 2' to around 4 bar. The air is led from compressor 2' to compressor 2 by way of a line 3'. The air in the line 3' is cooled in a heat exchanger 45 between the compressors before it is led into compressor 2. In compressor 2 the air is further compressed to a pressure of around 16.7 bar. The need for air to the combustion in such a plant is around 400 kg air/s.

From compressor 2 the compressed air is led by way of a line 3 to a combustion chamber 6. The pressure of the air is adjusted to the working pressure in the combustion chamber so that the air is forced into the chamber. Here, the pressure must lie above the working pressure in the combustion chamber by, for example 0.5 to 1 bar, such as 0.7 bar.

Fuel containing carbon or carbon compounds, such as for example hydrocarbons such as gas or oil, are fed to the combustion chamber 6 through fuel supply 9. Fuel that shall go into the combustion chamber 6 is pressurised by a pump (not shown) or the like to a pressure that permits the fuel to be forced into the combustion chamber. Thus, the pressure here must lie above the working pressure in the combustion chamber by, for example 0.5 to 1 bar, such as 0.7 bar. For use of natural gas, around 19 kg gas/s is used in such a plant.

Use of burners that give a low $NO_x$ content in the exhaust gas are preferred due to the environmentally alarming aspects of releasing such gases. With the use of such burners, NOx from a boiler with low NOx burners will be reduced to below 50 ppm. According to known and tested technology, further NOx can be removed with $NH_3$ ($3NO+2NH_3=2.5 N_2+3H_2O$) in a cleaning unit (not shown). This cleaning has up to 90% efficiency at atmospheric pressure, but is assumed to be much better at 16 bar. It will therefore be possible to clean down to 5 ppm. By adapting the heat exchangers, the gas can be given a temperature that is optimal for this process. Other methods without $NH_3$ also exist, methods which are relevant as $NH_3$ gives some $NH_3$ "slip".

The combustion in the combustion chamber 6 occurs at a pressure from atmospheric pressure to an overpressure, such as from 1.5 to 30 bar, for example from 5 to 25 bar, such as from 10 to 20 bar. A pressure of around 16 bar has been found to be particularly preferred from the demands of the subsequent cleaning and separation of $CO_2$ and operation experience from gas turbines and air compressors. It is a combustion at a pressure of around 16 bar which is used in the example presented here.

Total heat of combustion is here around 900MW.

The supply of oxygen-containing gas and fuel is controlled such that the exhaust gas from the combustion chamber has a residual content of oxygen from 1 to 10%, preferably from 1.5 to 6% and more preferably from 2-4%. This is considerably lower than in a gas turbine where the exhaust gas typically contains around 15% oxygen.

In the combustion, water that is supplied through the water supply 4 is heated to produce steam which is fed to, by way of a steam outlet 5, and expanded over a steam turbine 53. The expanded steam from the turbine 53 is thereafter led by way of supply 4' to the combustion chamber 6 to be heated up again. The re-heated steam leaves the combustion chamber in a line 5' where it is led to a steam turbine 54 where it is expanded.

From the steam turbine 54, the steam is led in a line 56 to a low-pressure turbine 57 where it is expanded further. The steam turbines 53,54 and the low-pressure turbine 57 are preferably arranged on a common shaft 55 that drives a generator 58 for generation of electric energy.

Most of the expanded steam/condensed water is led from the low-pressure turbine 57 by way of a line 59 to a heat exchanger 60 which cools the water further with external cooling water. After cooling/complete condensation, the water in line 59 is pumped up to the desired pressure for further circulation with the aid of a pump 61. This relatively cold water can be used to take care of low temperature energy at various locations in the plant in that it is heat exchanged with warmer streams which are to be cooled. This makes it possible to utilise/take care of low temperature heat energy, something which is essential for good energy economics.

This is illustrated here by a heat exchanger 62 which heat exchanges the cold stream in line 59 with a warmer stream in line 63. The stream in line 63 is a stream which is taken from the low-pressure turbine at a point where the steam is not completely expanded. The stream in line 63 is again pumped up to desired pressure in the further circulation with the aid of a pump 64. The streams in lines 59 and 63 are brought together in a line 65 which is heat exchanged with the exhaust gas from the combustion in an exhaust gas line 41, in a heat exchanger 67 to take care of residual heat before the water is led into a water tank 66.

A part stream of the cooled water in line 59 can be taken out in a line 68 and heated up by heat exchange possibly initially with the partially cooled exhaust gas in line 41 in a heat exchanger 69 and thereafter with the hot air in line 3' before the water in line 68 is led into the water tank 66.

From the water tank 66 the water is led by way of a line 70 to a pump 71 where the water is pumped to a desired pressure. From the pump 71, the water is led in line 70 to a heat exchanger 17 where the water is heated up by heat exchange with the warm exhaust gas in line 41. It may be desirable to take out smaller streams from the steam turbines 53 and 54 in lines 72 and 73, respectively, and heat exchange these streams with a side stream of the stream in line 70, shown with a line 76, and use these for heating of the water. Heated water from the heat exchangers 17 and 74, respectively, is led into line 4 and in for cooling of the combustion chamber.

The gas in the combustion chamber 6 is cooled by this production of steam so that the working temperature in the combustion chamber is kept in the area 700 to 900° C., typically in the area 800 to 850° C. Preferably more than 50%, more preferred more than 60%, most preferred more than 70% of the heat energy from the combustion in the combustion chamber is taken out as hot steam in the cooling of the combustion chamber.

The very large amount of heat which is removed from the combustion chamber ensures that most of the oxygen in the air can be used without the temperature becoming unacceptably high. This gives a high concentration of $CO_2$ in the exhaust gas, consumption of relatively small amounts of air in relation to the amount of energy which is produced, and thereby the essential advantage that a relatively small volume stream of exhaust gas will have to be cleaned. When most of the electric energy is produced in efficient steam turbines, the heat load on the critical gas-gas heat exchanger 8 is considerably reduced, something which gives reduced dimensions and simpler construction. The low temperature and reduced heat load also means that one has fewer problems with heat expansion and corrosion than at higher temperature and heat load. Plant costs and maintenance costs can thereby be reduced, at the same time as more energy is produced and cleaning of the exhaust gas is simplified without a great loss of electrical efficiency.

With reference to FIG. 1 the exhaust gas from the combustion chamber 6 is led through an exhaust gas pipe 10, through one or more gas-gas heat exchangers 8, 11 and a trim cooler 12, where the exit gas is cooled before it is led into a contact device 13 where the gas is brought into contact with an absorption agent. The pressure in the contact device 13 lies close to the pressure in the combustion chamber 6 as the pressure is only reduced corresponding to the drop in pressure through the heat exchangers 8, 11 and the trim cooler 12.

Water, which is a result of the combustion in the combustion chamber 6 and which is condensed during the cooling of the exhaust gas through heat exchangers, is separated in a water separator 50 before the contact device 13. Water can dilute and otherwise damage the absorption agent in the contact device.

In the enclosed figure, heat exchangers 8, 11 are two heat exchangers that are connected in series. The number of heat exchangers and the dimensioning of these are dependent on the actual dimensioning and design of an actual plant and can therefore vary from plant to plant. A typical plant will contain from two to four heat exchangers in series. The temperature in the contact device 13 is dependent on the absorption agent and is a compromise between low temperature which gives high solubility, and higher temperature which promotes reactions associated with the absorption process. Typical temperatures are below 20° C. for water, 50° C. for amines and 80 to 100° C. for use of inorganic solutions, such as potassium carbonate.

The preferred absorption agents are fluids such as water, an amine solution or an inorganic aqueous solution such as a carbonate solution which can absorb relatively large amounts of $CO_2$ at high pressure and high partial pressure of $CO_2$. The absorption agent in the contact device 13 preferably runs down a large inner surface counter-current to the gas.

The contact device is preferably operated at an elevated pressure, for example above 8 bar, more preferably above 10 bar. The pressure can also be higher such as for example above 15 or 20 bar.

The gas from the exhaust gas which is not absorbed in the solvent is led from the contact device through a gas pipe 14, through heat exchangers 11, 8 where the gas is heated before it is expanded in turbine 15, 15' so that the energy is able to be used in the hot, high-pressure gas further on in the process. Water from the water separator 50 is preferably taken out through a line 52, pumped by a pump 51 and led, together with the cleaned gas, into line 14. The water is evaporated in the heating of the cleaned gas and supplies the gas with a part of the mass, which has been removed in the condensation of water and cleaning, and thus increases the heat capacity of the gas.

The efficiency can also be increased by inserting a compressor in line 14, between the contact device 13 and heat exchangers 11, 8. This compression heats the gas, a heat which can be taken out again later, and it makes it possible to permit a greater pressure drop in the heat exchangers. Thus, it is feasible to obtain a better heat transfer in a smaller area, something which makes it possible to use cheaper heat exchangers.

Figure 2:
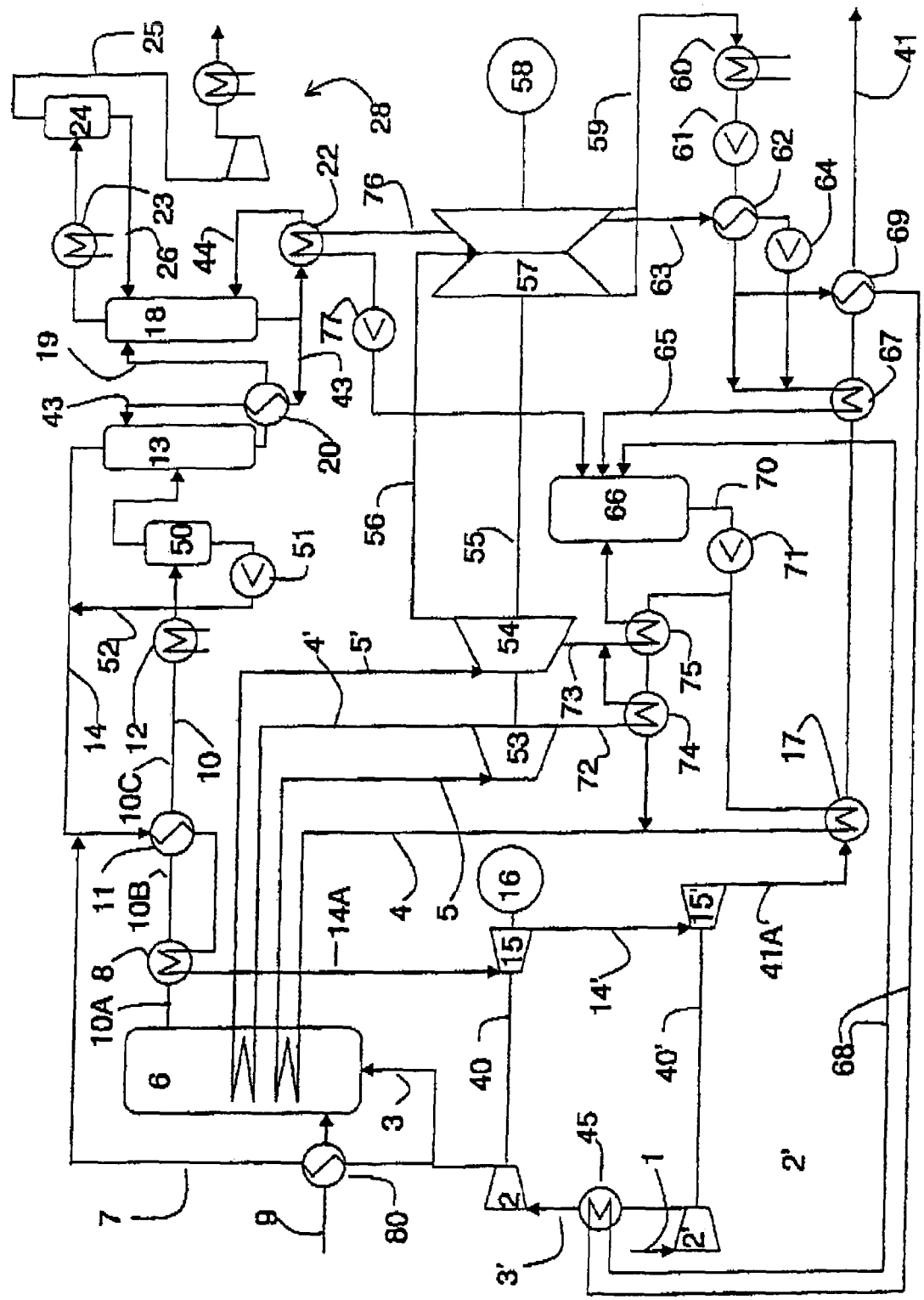
FIG. 2 is an alternative embodiment with increased efficiency.

It can also be relevant to compensate for reduced mass flow because of the $CO_2$ which is removed, by feeding in a small compressed gas stream which is taken out of line 3, cool this gas down so that heat is not lost, for example by pre-heating the combustion gas 9, which is shown in FIG. 2, and lead this into the cleaned gas before the heat exchanger 11. It is preferred that the gas has about the same temperature as the gas in line 14 and cooling should therefore be rated according to this.

It is preferred that turbine 15 is more than one turbine, such as, for example two turbines, 15 and 15', connected in series, where a line 14' leads the gas which is partially expanded in turbine 15 to turbine 15'.

It can be preferable that compressor 2' and turbine 15' are arranged on a common shaft 40' and that the compressor 2' and the turbine 15' are rated so that the kinetic energy from the turbine 15' is just sufficient to drive the compressor 2'. Compressor 15 is arranged on a shaft 40 together with compressor 2 and a generator 16. The kinetic energy from turbine 15 is greater than what is required to drive the compressor 2 and the remaining kinetic energy is therefore used to produce electricity in a generator 16 which is placed on the same shaft. The generator works as a motor in the start-up of the plant. This kinetic energy can, if required, naturally also be used for other purposes, such as for example a re-circulation pump for the absorption agent, a re-circulation pump for boiler water, a vacuum pump, a compressor for the enriched $CO_2$, or a combination of these.

From turbine 15, the expanded exit gas from the turbine 15 is led through a heat exchanger 17 where the residual heat in the gas is used for a suitable application in the plant. In the embodiment shown, this heat is used to heat the water in line 4.

In the shown device, the solvent containing $CO_2$ is fed from the contact device 13 by way of a pipe 19, by way of a heat exchanger 20 and an expansion device (not shown) inside a desorption device 18. The pressure in the desorption device 18 is dependent on the choice of absorption agent, the amount of absorbed $CO_2$ and the demands for regeneration. The pressure will normally be lower than the pressure in the contact device 13 and will normally be between 0.2 and 1 bar above the surrounding pressure.

To increase the release of absorbed gas from the absorbent in the desorption device, a part of the absorbent will normally be removed in the bottom of the desorption device and be led through a circulation pipe 44 through a circulation heater 22, where the absorbent is heated before it is led back to the desorption device 18. Heat energy to the circulation heater 22 can be taken out from another location in the plant, for example, in that a stream of steam is taken out, at a suitable pressure and temperature, from the low-temperature turbine 57 and led in a line 76 to the heat exchanger 22 where the stream in the circulation pipe 44 is heated up by the hotter stream in line 76. The steam that has been taken out in line 76 is condensed in the heat exchanger and is pumped further to a water tank 66 by a pump 77. For example, 30 kg steam/s can be taken out in line 76 at a temperature of 200° C. and a pressure of 2.4 bar.

The energy requirement for this circulation heater is minimised as the contact device 13 is driven at a high partial pressure of $CO_2$ in the incoming gas. At the same time, the steam which is used has a low value as it is already partly expanded over high-pressure and intermediate-pressure turbines 53 and 54.

$CO_2$ rich gas which is released in the desorption device 18 is removed from the top of this and is then preferably led through a condenser 23, where it is cooled, and a liquid separator 24, before it is led through a $CO_2$ pipe 25 as an $CO_2$ rich gas stream. Liquid which is separated out in the liquid separator 24 is returned to the desorption device through a liquid-carrying pipe 26.

Regenerated absorbent from the bottom of the desorption device 18 is removed and pumped through a re-circulation pipe 43, cooled in a heat exchanger 20, and possibly further heat exchangers, before it is returned to the absorption device 13.

The $CO_2$ rich gas stream from the liquid separator 24 is led to a compressor system 28 through a $CO_2$-carrying pipe 25, said compressor system comprises a number of compression steps in which the gas is compressed in such a way that it can be stored, transported, deposited in a secure way or be sold. The components and construction of this compressor system are of a conventional type and will not be described further here. This $CO_2$ rich gas stream will typically contain from around 80-95%, and preferably more than 90%, of the total $CO_2$ from the combustion according to the design and control parameters of the plant.

The gas which is led out in pipe 14 from the contact device 13 has a low $CO_2$ content, typically around 10% of the total $CO_2$ from the combustion. As mentioned above, this gas is supplied, through line 52, with water that has previously been removed from the exhaust gas, it is heated by heat exchange with the hot exhaust gas in heat exchangers 11 and 8 before it is expanded over the turbines 15,15'.

An essential feature of the present method and device is that a substantial part of the heat energy from the combustion in the combustion chamber 6 is taken out as steam which is used to drive the steam turbines 53, 54 and 57. In that a substantial part of the heat energy is taken out as steam, a feature which is much different from conventional solutions, the temperature in the combustion chamber and consequently of the exhaust gas from the combustion chamber is moderate and adapted to the operation of the gas turbine, and the combustion chamber pressure shell is further cooled, in spite of nearly full utilisation of the oxygen content of the air and thereby production of a high partial pressure of $CO_2$. This leads to considerably lower load and thereby demands on the heat exchanger 8, which would be a weak part in a plant where most of the heat energy is taken out in gas turbines driven by the exhaust gas from the combustion. This is illustrated here by table 1, which gives a few important measuring values for a plant according to the present invention. FIG. 1. Pressure, temperature, amountand effect for different units/at different locations in a 400 MW plant.

| Ref. no. | Pressure (bar) | Temperature (° C.) | Amount (kg/s) | Effect (MW) |
|---|---|---|---|---|
| 1 | 1 | 15 | 400 | |
| 2' | | | | 65 |
| 3' | 4.2 | | | |
| 3 | 16.7 | 300 | | |
| 4 | 207 | 270 | 240 | |
| 4' | 45 | 350 | 230 | |
| 5 | 180 | 565 | 240 | |
| 5' | 39 | 565 | 230 | |
| 6' | | | | 900 |
| 8 | | | | 30 |
| 9 | | | 19 | |
| 10A | 16 | 860 | | |
| 10B | 16 | 800 | | |
| 10C | 16 | 80 | | |
| 11 | | | | 400 |
| 14A | 16 | 845 | | |
| 15 | | | | 156 |
| 15' | | | | 65 |
| 16 | | | | 72 |
| 41A | 1 | 360 | | |
| 41 | 1 | 80 | | |
| 53 | | | | 80 |
| 54 | | | | 90 |
| 57 | | | | 180 |
| 58 | | | | 350 |
| 59 | 0.03 | 24 | | |
| 66 | 10 | 180 | | |

The configuration according to FIG. 1 of a plant according to the present invention can be varied with respect to heat exchangers, pumps, etc, without this diverting from the inventive concept. Elements that are shown here with a symbol can be a combination of similar or different elements which together give the desired and described function. Thus, what has been illustrated as a heat exchanger can describe a combination of heat exchangers, Likewise, such a plant will be able to encompass further elements which are not described here, such as further heat exchangers to take care of smaller amounts of energy, pumps or pressure reducing valves to regulate the pressure in certain elements, etc.

Similarly, during the engineering and optimisation of a particular plant, one will be able to deviate from details in the described mass and energy flow.

A good increase in efficiency can be obtained by a combination in which the fuel gas is pre-heated, at the same time as additional amounts of cooled air are supplied to the cold side of heat exchanger 11. Energy for heating of this gas can be taken out from different locations where cooling is required, or can be taken out from the compressors 2,2' as shown in FIG. 2. Some of the air, for example, about 45 kg air/s, is taken from stream 3. The additional amount of air is led in a line 7, by way of a heat exchanger 80, where it is heat exchanged with the incoming fuel gas in line 9, 19 kg/s at 15° C., to heat the fuel gas up to around 240° C., while the air is cooled down to around 60° C. The cooled air in line 7 is led to line 14 where it is added to the exhaust gas to give a greater stream volume and greater mass to increase the ability of the gas to take up heat and thereby cool the exhaust gas in line 10 with the aid of heat exchangers 8, 11. This preheating, as given in FIG. 2 can, according to calculations, give an increase of around 1% in the efficiency of the power plant for conversion of heat energy to electric power by combustion.

If one has no use for the heat in the compressed air for heat exchange with the fuel, line 7 can alternatively be supplied with air directly from the compressors 2, 2' or from a separate compressor (not shown).

High temperatures and pressures place great demands on the construction and choice of materials for the hot components. Building of components, such as a combustion chamber and heat exchangers for high pressure and high temperature, is complicated and costly. A traditional combustion chamber for the pressure preferred here necessitates costly materials being chosen. It will be possible to reduce construction costs and vulnerability of the combustion chamber by the wall in the combustion chamber comprising two or more shells outside each other where the outer shell is a pressure shell and where the temperature of the outer shell can be kept below 350° C., preferably below 300° C.

Figure 3:
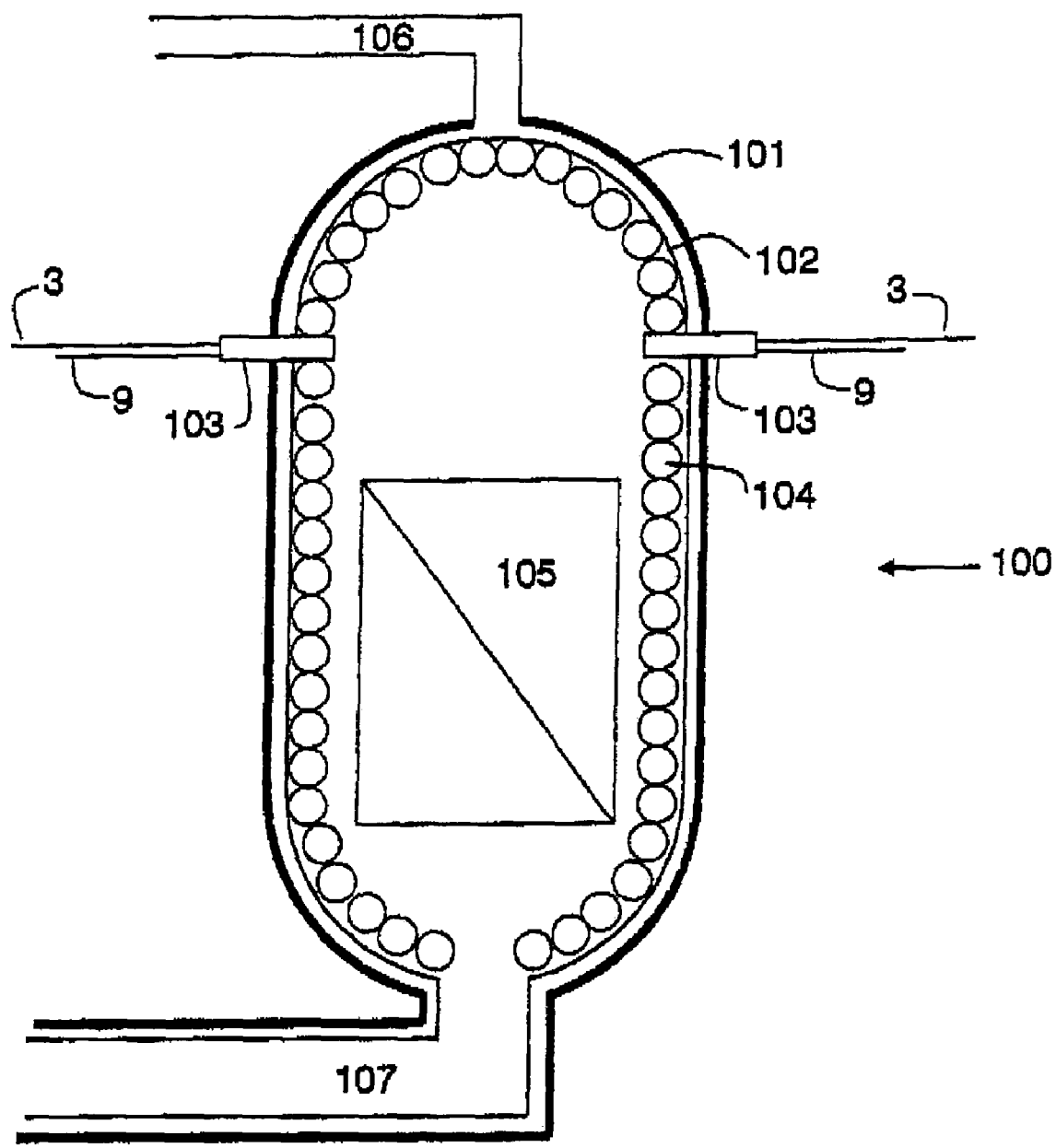
FIG. 3 is an embodiment of a pressurised combustion chamber where the outer shell is protected against the temperature of the combustion products with the aid of circulating $CO_2$ gas and circulating boiler water.

FIG. 3 shows such a combustion chamber 100, comprising an outer shell 101, an inner shell 102, between which shells a cooling medium, such as for example $CO_2$, can flow. $CO_2$ can be added through a cooling agent supply 106. Heated $CO_2$ is taken out and circulated by way of a cooling circuit for $CO_2$ (not shown). The heat energy from the hot $CO_2$ is preferably added to streams in the process which have a need for heat, with the help of lines (not shown) to either some of the heat exchangers that are shown in FIGS. 1 and 2 or heat exchangers that are not shown.

Fuel and oxygen containing gas, such as clean gas, oxygen enriched air or air, are supplied through lines 9 and 3, respectively, to one or more burners 103.

As shown in FIG. 3, $CO_2$ can also be led further around pipe 107 for flue gas, from the combustion chamber to downstream heat exchangers, where it can also be used for cooling. The amount of $CO_2$ that circulates between the outer and inner shells is regulated so that the temperature of the outer shell 101 does not exceed 350° C., preferably does not exceed 300° C. With the temperature of the outer shell being kept below 350° C., one can use relatively inexpensive materials here and the production of this becomes simpler and cheaper than if the shell should withstand higher temperatures.

Inside the outer shell 101, an inner shell 102 is arranged, which is manufactured from a heat-resistant material. Preferentially, there is no pressure drop or only a small pressure drop between the inner and outer sides of the inner shell so that this is not exposed to large pressure loads. If desired, the wall of the combustion chamber can comprise more than two shells.

The inner wall of the combustion chamber, i.e. inside the inner wall 102, is covered by one or more pipes 104 that lie as one or more spirals along the wall. The spiral pipe 104 preferably covers the whole of the inner surface of the inner shell and protects this against combustion products inside the combustion chamber at the same time as it lowers the temperature both in the combustion chamber and of the inner wall 102. The pipe 104 will lead a stream of boiler water which gives an extra safety against the temperature of the outer pressure-shell not exceeding 300 to 350° C. This heat, which is added to the water in the pipes 104 can, for example, be added to the boiler water as preheating, in that the pressurising gas circulates by way of a heat exchanger where this heat is used for heating in lines where one has a need for heat at the relevant temperatures.

The temperature in the combustion chamber is lowered further with heat spirals 105, which is a combination of several heat spirals fitted inside the combustion chamber. The heat spirals 105 are heat spirals that are supplied with water/steam through lines 4 and 4' and/or directly from the pipes 104.

A high-temperature heat exchanger should not be cooled down and heated up repeatedly if it shall also function as a pressure container. Therefore, it can be advantageous that hot heat exchangers, i.e. the heat exchangers in which one of the streams is above 350° C., is constructed with an outer pressure-shell and an inner shell between which flows a cooling medium, such as $CO_2$ or nitrogen, in the same way as for the combustion chamber. Alternatively, the container around the heat exchanger can be cooled directly or indirectly with boiler water as the cooling agent. A further alternative is to build the heat exchanger inside the pressurised combustion chamber, where it does not need to function as a pressure container any longer.

It can also be relevant to carry out other specific construction adjustments on some elements, in particular to improve operating safety, reduce building costs and reduce the danger of wear and associated errors. Thus, it can be relevant to use a cooling gas such as $CO_2$ to cool the shell of the combustion chamber 6 and other hot elements such as hot heat exchangers, for example heat exchanger 8. This heat energy in this cooling gas can be used in that it is supplied to heat exchangers for heating at locations in the process where it is possible to utilise low-grade energy, in particular this concerns preheating of water to the combustion chamber. Cooling of pressurised combustion chamber and pressurised heat exchangers to a shell temperature lower than 350 degrees C. gives the opportunity of using high tensile, low-alloy and inexpensive steel qualities. The system can also be used for heating of these elements before start-up of the plant. This reduces heat tensions and reduces the risk of cracking in pressure-shells and pipes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for generation of electric energy from a carbonaceous fuel, comprising the steps of:
    combusting the fuel in the presence of oxygen under elevated pressure in a combustion chamber;
    generating steam in the combustion chamber to reduce the temperature therein;
    withdrawing an exhaust gas from the combustion chamber;
    separating the exhaust gas from the combustion chamber into a $CO_2$ rich fraction and a $CO_2$ depleted fraction;
    treating the $CO_2$ rich fraction so that it does not escape to the surroundings;
    expanding the $CO_2$ depleted fraction over one or more turbines for operation of other processes and/or generation of electric energy; and
    releasing the $CO_2$ depleted fraction into the surroundings.

2. The method according to claim 1, wherein more than 50% of the heat energy from the combustion in the combustion chamber is used to produce steam in the combustion chamber.

3. The method according to claim 1 or 2, further comprising the step of heat exchanging the exhaust gas from the combustion chamber against the $CO_2$ depleted fraction, for cooling of the exhaust gas and heating of the $CO_2$ depleted fraction before the $CO_2$ depleted fraction is expanded over turbines.

4. The method according to claim 3, further comprising the step of adding water and/or air to the $CO_2$ depleted fraction to increase the ability of the $CO_2$ depleted fraction to take up heat from the hot exhaust gas from the combustion chamber.

5. The method according to claim 1, further comprising the step of heating the fuel before it is fed to the combustion chamber.

6. The method according to claim 5, further comprising the steps of:
heating the fuel by heat exchanging against a part stream from an air compressor; and
supplying the heat exchanged and thus cooled air stream to the $CO_2$ depleted fraction to increase the heat capacity thereof.

7. A thermal power station for carbonaceous fuel, comprising:
a combustion chamber, where the fuel is burned under elevated pressure in the presence of oxygen;
a gas pipe for leading an exhaust gas from the combustion chamber through cooling means into a contact device where the exhaust gas is brought into contact with an absorption agent in which mainly $CO_2$ is absorbed and where the other gases in the exhaust gas, in the main, are not absorbed;
a gas pipe for withdrawal of a not absorbed or $CO_2$ depleted fraction, from the contact device;
means to reheat the $CO_2$ depleted fraction;
means for expansion of the reheated $CO_2$ depleted fraction before releasing the expanded $CO_2$ depleted fraction into the surroundings; and
means to transport the absorption agent with absorbed $CO_2$ from the contact device to deposition or to means for regeneration of the absorption agent for re-circulation to the contact device,
wherein the combustion chamber comprises means to provide steam and lines to lead the steam to steam turbines for expansion of the steam.

8. The thermal power plant according to claim 7, further comprising a condensation chamber for condensation of water in the exhaust gas arranged before the contact device.

9. The thermal power plant according to claim 8, further comprising means to add the water which has condensed in the condensation chamber to the $CO_2$ depleted fraction to increase the heat capacity of the $CO_2$ depleted fraction.

10. The thermal power plant according to claim 7 or 8, wherein the combustion chamber comprises:
an outer shell and an inner shell between which flows a cooling medium and where pipes, that cover the inner surface of the combustion chamber, are arranged; and
means to circulate water through the pipes.

11. The method according to claim 1, wherein more than 60% of the heat energy from the combustion in the combustion chamber is used to produce steam in the combustion chamber.

12. The method according to claim 1, wherein more than 70% of the heat energy from the combustion in the combustion chamber is used to produce steam in the combustion chamber.

13. The method according to claim 11 or 12, wherein the exhaust gas from the combustion chamber is cooled by heat exchange with the $CO_2$ depleted fraction for heating of the $CO_2$ depleted fraction before the $CO_2$ depleted fraction is expanded over turbines.

14. The method according to claim 13, wherein water and/or air is added to the $CO_2$ depleted fraction to increase the ability of the $CO_2$ depleted fraction to take up heat from the hot exhaust gas from the combustion chamber.

15. The thermal power plant according to claim 7, wherein a heat exchanger is provided on an inlet line of the fuel to heat the fuel before it is introduced into the combustion chamber.

16. A thermal power station for carbonaceous fuel, comprising:
a combustion chamber, where the fuel is burned under elevated pressure in the presence of oxygen;
a gas pipe for leading an exhaust gas from the combustion chamber through a cooling device into a contact device where the exhaust gas is brought into contact with an absorption agent in which mainly $CO_2$ is absorbed and where the other gases in the exhaust gas, in the main, are not absorbed;
a gas pipe for withdrawal of a not absorbed or $CO_2$ depleted fraction, from the contact device;
a reheating device that reheats the $CO_2$ depleted fraction;
an expansion device that expands the reheated $CO_2$ depleted fraction before releasing the CO2 depleted fraction into the surroundings; and
a transporting device that transports the absorption agent with absorbed $CO_2$ from the contact device to deposition or to a regeneration device that regenerates the absorption agent for re-circulation to the contact device,
wherein the combustion chamber comprises a device to provide steam and lines to lead the steam to steam turbines for expansion of the steam.

17. The thermal power plant according to claim 16, further comprising a condensation chamber for condensation of water in the exhaust gas arranged before the contact device.

18. The thermal power plant according to claim 17, further comprising a device that adds the water which has condensed in the condensation chamber to the CO2 depleted fraction to increase the heat capacity of the CO2 depleted fraction.

19. The thermal power plant according to claim 16 or 17, wherein the combustion chamber comprises:
an outer shell and an inner shell between which flows a cooling medium and where pipes, that cover the inner surface of the combustion chamber, are arranged; and
a circulation device to circulate water through the pipes.

20. The thermal power plant according to claim 16, wherein a heat exchanger is provided on an inlet line of the fuel to heat the fuel before it is introduced into the combustion chamber.

* * * * *